(12) United States Patent
Huke et al.

(10) Patent No.: US 12,175,833 B2
(45) Date of Patent: *Dec. 24, 2024

(54) MARKETPLACE OF ODDS

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 452 days.

This patent is subject to a terminal disclaimer.

(21) Appl. No.: 17/562,455

(22) Filed: Dec. 27, 2021

(65) Prior Publication Data
US 2022/0139155 A1    May 5, 2022

Related U.S. Application Data

(63) Continuation-in-part of application No. 17/101,177, filed on Nov. 23, 2020, now Pat. No. 11,210,895.

(60) Provisional application No. 63/107,675, filed on Oct. 30, 2020.

(51) Int. Cl.
*G07F 17/32* (2006.01)
*G06Q 20/02* (2012.01)
*G06Q 50/34* (2012.01)

(52) U.S. Cl.
CPC .......... *G07F 17/323* (2013.01); *G06Q 20/02* (2013.01); *G06Q 50/34* (2013.01); *G07F 17/3288* (2013.01)

(58) Field of Classification Search
CPC ... G07F 17/323; G07F 17/3288; G06Q 20/02; G06Q 50/34
See application file for complete search history.

(56) References Cited

U.S. PATENT DOCUMENTS

| 4,322,612 | A | 3/1982 | Lange |
| 9,076,305 | B2 | 7/2015 | Amaitis et al. |
| 10,198,899 | B2 | 2/2019 | Yang |
| 10,275,527 | B2 | 4/2019 | English et al. |
| 10,460,566 | B2 | 10/2019 | Amaitis et al. |
| 2002/0068633 | A1 | 6/2002 | Schlaifer |
| 2002/0155885 | A1 | 10/2002 | Shvili |
| 2003/0045358 | A1 | 3/2003 | Leen et al. |
| 2007/0087843 | A1 | 4/2007 | Steil et al. |
| 2008/0026826 | A1 | 1/2008 | Grosswirt |
| 2008/0182644 | A1 | 7/2008 | Lutnick et al. |
| 2010/0105464 | A1 | 4/2010 | Storm et al. |

(Continued)

OTHER PUBLICATIONS

International Search Report and Written Opinion issued on Feb. 4, 2022 in corresponding International Patent Application No. PCT/US2021/057298; 7 pages.

*Primary Examiner* — Kevin Y Kim
(74) *Attorney, Agent, or Firm* — Maier & Maier, PLLC (57) ABSTRACT

A system for a user to choose from a number of odds offered by multiple wagering networks. The user can select one of the odds options. In an embodiment, the user has a GUI process (such as a scroll) to select the option of the odds. A user is provided two or more odds for a bet on one or more platforms. The user can select one of the odds options. In an additional embodiment, the user can receive one or more odds for a bet of one or more platforms and the user has the ability to respond to the one or more bets by offering an alternative odds for the bet. If a platform is accepted, then the bet will be concluded between the user and the platform.

7 Claims, 2 Drawing Sheets

Content - High Level Diagram (56) References Cited

U.S. PATENT DOCUMENTS

| | | |
|---|---|---|
| 2012/0190386 A1 | 7/2012 | Anderson |
| 2019/0251794 A1 | 8/2019 | Simon et al. |
| 2019/0287351 A1 | 9/2019 | Russell et al. |

Fig.1 Content - High Level Diagram

Fig.2 wagering network module Object Content

Fig.3 user module Object Content

Fig.4 settlement module Object Content

MARKETPLACE OF ODDS

CROSS-REFERENCE TO RELATED APPLICATIONS

The present patent application claims benefit and priority to U.S. Non-Provisional application Ser. No. 17/101,177 filed on Nov. 23, 2020 entitled "MARKETPLACE OF ODDS" which claims benefit and priority to U.S. Provisional Patent Application No. 63/107,675 entitled "MARKETPLACE OF ODDS" filed on Oct. 30, 2020 which is hereby incorporated by reference into the present disclosure.

FIELD

The present disclosure is generally related to play by play wagering on a live sporting event and how users can interact with multiple wagering networks.

BACKGROUND

With broader access to sports wagering becoming possible after the U.S. Supreme Court struck down the Professional and Amateur Sports Protection Act in 2018 wagering on mobile devices will become a significant portion of this new market.

As more wagering options become available on live sporting events more providers will move to fill those options. With more providers and more wager options it is likely that no one provider will offer all available wager options.

An increase in the number of wagering providers increases the importance of being able to compare odds offered on the same wager option.

SUMMARY

A method, system, and apparatus to provide a marketplace for making and sharing odds, such as odds for real time wagers in a play by play wagering system. One embodiment includes a system for providing a marketplace of odds in a play by play wagering system, including: at least one wagering network that offers wagers on plays inside of a live sporting event, and a wagering marketplace that collects wagers from users and the at least one wagering network, allows the users to place wagers offered by the wagering network, allows the users to propose wagers, and allows the at least one wagering network and/or other users to accept user proposed bets.

In another exemplary embodiment, a method for displaying a marketplace of wagering odds on a single play of a live sporting event may be provided, including executing on a processor the steps of: displaying a wagering game; displaying one or more available wagers and odds from at least one wagering network, the one or more available wagers for a single play of a live sporting event; and displaying identifying data of a source of the wager with the one or more available wagers and odds.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game.

"Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (5) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means.

State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
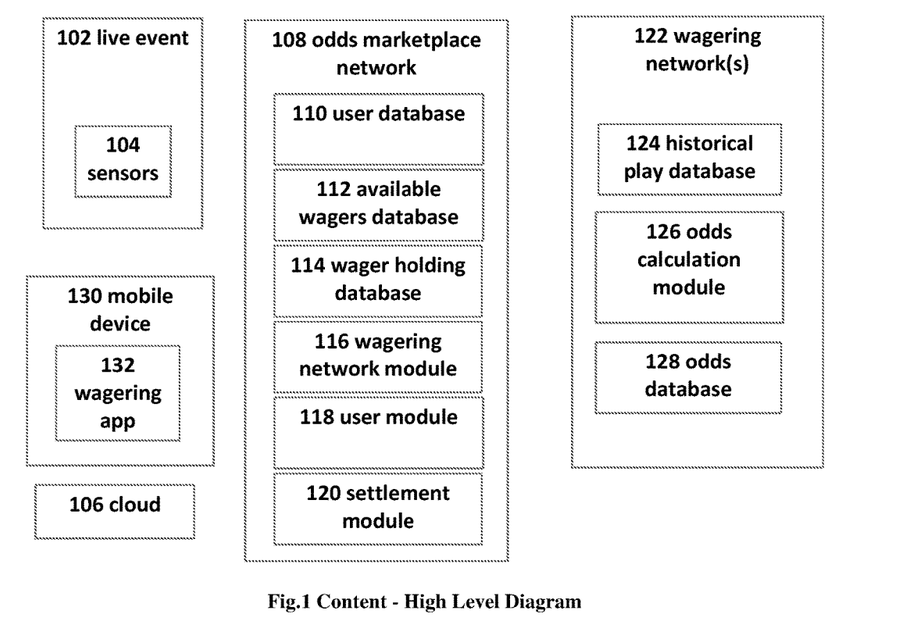
FIG. 1 illustrates a marketplace of odds, according to an embodiment.

FIG. 1 is a system for in-play wagering through an odds marketplace network 108. This system comprises of a live event 102, for example, a sporting event such as a football game, a basketball game, a hockey game, a tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round-robin, or other styles of tournaments. There are other types of wagers, including parlays, teasers and prop bets, that are added games, that often allow the user to customize their betting, by changing the odds and pay-outs they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have a number of bets they can handle and a limit of wagers they can take on either side of a bet before they will move the line or odds off of the opening line. Additionally, there are circumstance, such an injury to an important player such as a listed pitcher, in which a sportsbook, casino or racino will take an available wager off the board. As the line moves there becomes an opportunity for a bettor to bet on both sides at different point spreads to middle and win both bets. Sportsbooks will often offer bets on portions of games, such as first half bets and half-time bets. Additionally, the sportsbook can offer futures bets on live events 102 in the future. Sportsbooks need to offer payment processing services to cash out customers. This can be done at kiosks at the live event 102 or another location. For example, consider a live event 102 being a baseball game that is played between the New York Yankees and the Los Angeles Dodgers, at Yankee Stadium, New York City.

Further, embodiments may include a plurality of sensors 104 that may be used such as motion sensors, temperature sensors, humidity sensors, cameras such as an RGB-D camera which is a digital camera capturing color (RGB) and depth information for every pixel in an image, microphones, a radiofrequency receiver, a thermal imager, a radar device, a LIDAR device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that collects statistical information through real-time X, Y positioning of players and X, Y, Z positioning of the ball. In the example of a baseball game, the plurality of sensors 104 may be used for capturing parameters such as spin rate of the ball, ball positions, launch angle, and exit velocity.

Further, embodiments may include a cloud 106 or communication network which may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable resources and higher-level services that can be rapidly provisioned with minimal management effort, for example over internet, and relies on sharing resources to achieve coherence and economies of scale, like a public utility, while third-party clouds enable organizations to focus on their core businesses instead of expending resources on computer infrastructure and maintenance. The cloud 106 may be communicatively coupled to each wagering network 122 which may perform real time analysis on the type of play and the result of the play. The cloud 106 may also be synchronized with game situational data, such as the time of the game, the score, location on the field, weather conditions, and the like which may affect the choice of play utilized. For example, in other embodiments, the cloud 106 may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various embodiments herein.

Further, embodiments may include the odds marketplace network 108 which may be synchronized with each wagering network 122 that are performing real-time analysis on the type of play and the result of a play or action. In one embodiment, the odds marketplace network 108 may facilitate users with a plurality of odds from each wagering network 122, such as, but not limited to, Draftkings, Wendell, BetMGM, etc. It can be noted that the odds marketplace network 108 may work as a communication network for each wagering network 122. Further, the odds marketplace network 108 may facilitate a user to monitor available wagers and to propose wagers. In another embodiment, the odds marketplace network 108 may facilitate holding and transferring of funds for the accepted wagers. In one embodiment, the odds marketplace network 108 may be synchronized with the live event 102 to track each live event 102 or the whole season related to the live event 102. Further, the odds marketplace network 108 may be synchronized with game situational data, such as the time of the game, the score, location on the field, weather conditions, and the like which may affect the choice of play utilized. In one example embodiment, the odds marketplace network 108 may facilitate settlement options to the user. In another embodiment, the odds marketplace network 108 may use third party balance settlement apps. For example, the wagering app 132 may use Paypal for settlement of the balances of the user.

In another embodiment, the odds marketplace network 108 may include a wagering network and a wagering exchange, where the wagering exchange facilitates wagers proposing and accepting wagers between a wager proposing entity and a wager accepting entity. For example, a first user or entity may post a wager on the wagering exchange of the odds marketplace network 108. A second user or entity may see a display of the offered wager and accept it. The odds marketplace network 108 and/or a wagering network or system housing the odds market place and wagering exchange, may then host the wager between the first user and the second user and, upon a determination of the outcome of the wager, the wagering exchange may provide an appropriate payout to the winning user or entity, either directly or via a transfer to a winning user's account from a losing user's account.

Further, embodiments may utilize a user database 110 which contains data relevant to all users of each wagering network 122, which may include, a user ID, a device identifier, a paired device identifier, wagering history, and wallet information for the user. The user database 110 may also contain a list of user account records associated with a respective user ID. For example, a user account record may include information such as user interests, user personal details such as age, mobile number, etc., sporting events played before, highest wager, favorite sporting event, and current user standings and balance corresponding to the user ID. In addition, the user database 110 may contain betting lines and search queries for each wagering network 122. The user database 110 may be searched based on a search criteria received from the user. Each betting line may include a plurality of betting attributes such as at least one of the live event 102, a team, a player, an amount of wager, etc. The user database 110 may include information related to all the users involved in the live event 102. In one example embodiment, the user database 110 may include information for generating a user authenticity report and a wagering verification report. Further, the user database 110 may be used to store user statistics like, but not limiting to, retention period for a particular user, frequency of wagers placed by a particular user, average amount of wager placed by each user.

Further, embodiments may utilize an available wagers database 112, that contains wagers available from each wagering network 122 and wagers proposed by the users. In one embodiment, the wagering networks 122 may include, but not limited to, Draftkings, Wendell, and BetMGM. For example, the available wagers database 112 includes that the odds of Aaron Judge hitting a single are 4/1 at Draftkings and 3/1 at Wendell, odds of Aaron Judge hitting a homerun are 3/1 at Draftkings, 2/1 at Wendell, and 3/1 at BetMGM, and odds of Aaron Judge hitting a double are at odds of 2/1 at Draftkings, 2/1 at Wendell, and 3/1 at BetMGM. In one embodiment, the available wagers database 112 may contain wagers proposed by the users. For example, the available wagers database 112 includes a wager of $100 on Aaron Judge hitting a single at odds of 4/1, placed by the user. In another example, the available wagers database 112 includes a wager of $200 on Aaron Judge hitting a double at odds of 3/1, placed by the user.

Further, embodiments may utilize a wager holding database 114, which holds funds for wagers that are accepted by a wagering network module 116. For example, with an opening account balance of $2000, the user selects a wager of $100, the wager holding database 114 holds $100, for further settlement. In one embodiment, the wager holding database 114 may hold funds with an outside bank network. The wager holding database 114 may allow the marketplace to hold funds and deliver them to the winner while ensuring wagers can be covered. In one embodiment, the wager holding database 114 may work as an escrow, which receives and disburses money for the primary transacting parties.

Further, embodiments may include the wagering network module 116, which is triggered when a wagering network administrator connects to the odds marketplace network 108. After connecting the wagering network administrator to the wagering network module 116, the wagering network module 116 may facilitate each wagering network 122 to begin posting odds related to the live event 102. In one embodiment, the wagering networks 122 may be, but are not limited to, DraftKings, Wendell, or BetMGM. For example, in a baseball game, Aaron Judge of the New York Yankees, is playing in the 3rd inning against Clayton Kershaw of the Los Angeles Dodgers. In a case, a first wagering network 122 i.e. Draftkings posts odds of Aaron Judge hitting a single are 4/1, hitting a homerun are 3/1, and hitting a double are 2/1. Further, a second wagering network 122 i.e. Wendell posts odds of Aaron Judge hitting a single are 3/1, hitting a homerun are 2/1, and hitting a double are 2/1. Further, a third wagering network 122 i.e. BetMGM posts odds of Aaron Judge hitting a homerun are 3/1 and hitting a double are 3/1. Further, the wagering network module 116 may facilitate an odds database 128 for each wagering network 122 brought into the available wagers database 112. For example, the odds database 128 of the first wagering network 122 (Draftkings) includes odds of Aaron Judge hitting a single are 4/1, hitting a homerun are 3/1, and hitting a double are 2/1, odds database 128 of the second wagering network 122 (Wendell) includes odds of Aaron Judge hitting a single are 3/1, hitting a homerun are 2/1, and hitting a double are 2/1, and odds database 128 of the third wagering network (BetMGM) includes the odds of Aaron Judge hitting a homerun are 3/1, and hitting a double are 3/1, are brought into the available wagers database 112. Further, the wagering network module 116 may continuously poll the available wagers database 112 for the wagers proposed by users. In one case, if no wagers from the users are available, then the wagering network module 116 may return to posting odds related to new wagers available for a next play. In another case, if the wagers are available from the users, then the wagering network module 116 may display the wagers from the users, to the wagering network administrator. For example, the wagering network module 116 polls a wager proposed by the user of $100 on Aaron Judge hitting a single at odds of 4/1. Based on the determination that the wagers are available from the users, the wagering network module 116 may display the available wagers to the wagering network administrator. In an exemplary embodiment, the available wagers may be displayed on a display of a mobile device 130. For example, the wagering network module 116 displays a wager of $100 on Aaron Judge hitting a single at odds of 4/1, as proposed by user. Further, the wagering network module 116 may continuously monitor a wager selection by the wagering network administrator. In one case, if the wagering network administrator selects the available wager, then the wagering network module 116 may trigger a settlement module 120. For example, the wagering network administrator selects a wager of $100 on Aaron Judge hitting a single at odds of 4/1 (proposed by user), then the wagering network module 116 triggers the settlement module 120. In another case, if the wagering network administrator does not select any available wager, then the wagering network module 116 may return to posting odds. Based on the determination that the wagering network administrator selects a wager, the wagering network module 116 may trigger the settlement module 120. In an alternate embodiment, the wagering network decisions may be made by an automated/algorithmic system, in real-time for in-play wagering. In another embodiment, the wagering network module 116 may compare the wagers proposed by the user against the odds of different wagering networks 122. Thereafter, the program ends.

Further, embodiments may include a user module 118, which is triggered when the user logs-in to the odds marketplace network 108. The user module 118 may facilitate the user to access the live event 102, place wagers or propose wagers related to the live event 102. Further, the user module 118 may retrieve wagers from the available wagers database 112. For example, the user module 118 retrieves that the odds of Aaron Judge hitting a single are 4/1 at Draftkings and 3/1 at Wendell. In this example, the user module 118 retrieves that the odds of Aaron Judge hitting a homerun are 3/1 at Draftkings, 2/1 at Wendell, and 3/1 at BetMGM. Further, the user module 118 retrieves that the odds of Aaron Judge hitting a double are 2/1 at Draftkings, 2/1 at Wendell, and 3/1 at BetMGM. Further, the user module 118 may display the wagers to the user. In one embodiment, the use module 118 may display the wagers on a display of the mobile device 130. For example, the user module 118 displays odds of Aaron Judge hitting a single are 4/1 at Draftkings and 3/1 at Wendell. In this example, the user module 118 displays that the odds of Aaron Judge hitting a homerun are 3/1 at Draftkings, 2/1 at Wendell, and 3/1 at BetMGM. Further, the user module 118 displays that the odds of Aaron Judge hitting a double are 2/1 at Draftkings, 2/1 at Wendell, and 3/1 at BetMGM. After displaying the wagers to the user, the user module 118 may determine whether the user wants to select the available wager or to post a wager. In one case, when the user selects the available wager, then the user module 118 may trigger the settlement module 120. In another case, when the user wants to post a wager, then the user module 118 goes to the available wagers database 112. For example, the user wants to post a wager of $100 on Aaron Judge hitting a single at odds of 4/1. Based on the determination that the user selects to select an available wager, the user module 118 may trigger the settlement module 120. Based on the determination that the user selects to post a wager, the user module 118 may move to the available wagers database 112. Thereafter, the user module 118 may constantly monitor the live event 102 for completion. In one case, when the live event 102 is concluded, then the user module 118 may again trigger the settlement module 120, to conclude on the wagers placed by the user. In another case, when the live event 102 is not concluded, then the user module 118 may return to retrieving the wagers from the available wagers database 112. Thereafter, the user module 118 may also constantly monitor if the user logs-off from a wagering app 132, during the live event 102. In one case, when the user logs-off from the wagering app 132, then the user module 118 may again trigger the settlement module 120, to conclude on the wagers placed by the user. In another case, when the user does not log-off from the wagering app 132, then the user module 118 may return to retrieving the wagers from the available wagers database 112. Thereafter, the program ends.

Further, embodiments may include the settlement module 120 which is triggered when a prompt is received either from the user module 118 or the wagering network module 116 after a wager has been accepted. Further, the settlement module 120 may check if the selected wager is covered by the user's account balance. In one case, if the selected wager is not covered by the user's account balance, then the selected wager may be rendered void. In one embodiment, the user may be notified about low user's account balance. For example, with an opening balance of $2000, the user wants to place a wager of $2100, then the selected wager is rendered void. In another case, if the selected wager is covered by the user's account balance, then the settlement module 120 may transfer funds (i.e. wager) from the user account to the wager holding database 114. For example, with an opening balance of $2000, the user selects a wager of $100 on Aaron Judge of the New York Yankees, playing in the 3rd inning against Clayton Kershaw of the LA dodgers, hitting a single at odds of 4/1, then the settlement module 120 transfers $100 to the wager holding database 114. It can be noted the funds transferred from the user's account balance may be temporary. In one embodiment, the funds transferred may be returned in case of cancellation of wager before a threshold time. For example, a user may cancel a wager within 30 seconds of placing the wager to return amount related to the placed wager. Further, the settlement module 120 may constantly monitor the live event 102 for completion. In one case, when the live event 102 is concluded, then the settlement module 120 may proceed to obtain the results of the live event 102. For example, the result of the live event 102 is that Aaron Judge hits a single during the live event 102. In another case, when the live event 102 is not concluded, then the settlement module 120 may continue monitoring the live event 102 for completion. Further, the settlement module 120 may compare the result of the live event 102 with the wagers placed by the user, to determine a result i.e. whether the user has won or lost. In this example, the wager of $100 placed for Aaron Judge of the New York Yankees, playing in the 3rd inning against Clayton Kershaw of the LA dodgers, hitting a single and the result of the live event 102 i.e. Aaron Judge of the New York Yankees, playing in the 3rd inning against Clayton Kershaw of the LA dodgers, hits a single, are compared to determine the result of the wager i.e. a win for the user. Based on the comparison of the result of the live event 102 and the wagers placed by the user, the settlement module 120 may calculate the balance amount for the user. For example, the user wins the wager of $100 at +400 odds that Aaron Judge will hit a single on the next play and the result of the live event 102 is Aaron Judge hits a single. Thus, the updated balance of the user (with an opening balance of $2000), after the completion of the live event 102, will be $2000+$400=$2400. Further, the settlement module 120 may update the account balance of the user who places the wager in the user database 110. In this example, after winning the wager of $100 placed (at odds of 4/1), the updated balance of the user is $2400. Thereafter, the process returns to the wagering network module 116. Further, embodiments may include the wagering networks 122 which may perform real-time analysis on the type of play and the result of a play or action. Each wagering network 122 (or cloud 106) may also be synchronized with game situational data, such as the time of the game, the score, location on the field, weather conditions, and the like which may affect the choice of play utilized. For example, in other embodiments, the wagering networks 122 may not receive data gathered from sensors and may, instead, receive data from an alternative data feed, such as SportsRadar®. This data may be compiled substantially immediately following the completion of any play and the data from this feed may be compared with a variety of team data and league data based on a variety of elements, including down, possession, score, time, team, and so forth, as described in various embodiments herein. Each wagering network 122 can offer a number of software as a service managed services such as, user interface service, risk management service, compliance, pricing and trading service, IT support of the technology platform, business applications, game configuration, state-based integration, integration to allow the joining of social media, as well as marketing support services that can create engaging promotions to the user. In one embodiment, each wagering network 122, via the wagering app 132, may facilitate settlement options to the user. In one example embodiment, the wagering networks 122 may refer to a first wagering network, a second wagering network, and a third wagering network. In one embodiment, the various wagering networks 122 may be, but are not limited to, DraftKings, Wendell, BetMGM, etc. In one embodiment, each wagering network 122 may facilitate users to place bets on during the live event 102. In another embodiment, the wagering networks 122 may use third party balance settlement apps. For example, the wagering app 132 may use Paypal for settlement of the balances of the user.

Further, embodiments may include a historical play database 124 that contains play data for the type of sport being played in the live event 102. The historical play database 124 may be associated with each respective wagering network 122. In one embodiment, for optimal odds calculation, the historical play data should include metadata about the historical plays, such as time of the live event 102, location, weather, previous plays, opponent, physiological data of the players (including blood pressure, pulse rate, and respiration rate), the batting average of all players, information related to the players such as injuries in the past, batting average, earned run average, catch probability, spin rate, launch angle, exit velocity, a bunt, a single, a double, a triple, a home run, a caught, a fly ball, information related to trainers of each player, etc. For example, in the baseball game, information stored in the historical play database 124 may include information related to the previous baseball games played by the New York Yankees such as, but not limited to, the weather condition, i.e. during the match, it was cloudy.

Further, embodiments may include an odds calculation module 126 which utilizes information from the historical plays database 124 and the information from the sensor feeds of sensors 104 to calculate odds for in-play wagers. The odds calculation module 126 may be associated with each respective wagering network 122. The information from the historical plays database 124 may include data related to the type of the play, the previous information related to players involved in the live event 102, and results of the previous live events 102. The odds for each live event 102, such as in a baseball game a particular player hitting a home run, a single, or a strikeout, may be calculated based on the information received from the sensor feeds of sensors 104 and the previous information related to the particular player. Further, the odds may be updated based on in-game events (for example, a player strikes a home run with the same pitcher, decreasing his odds of getting a strikeout from the same pitcher). The odds may be calculated or adjusted based on statistical information related to the live event 102 and the statistical information of the players. For example, the odds may be determined based on the historical data such as prior performance information about a player (like batting average against a certain pitcher, earned run average, catch probability, hamstring strain), and physiological information of player(s) etc., and current i.e. real-time information, such as current confidence level etc. In one embodiment, the type of wagering may depend on the type of game being played. In one embodiment, the odds calculation module 126 may determine the available wagers to the user. The odds calculation module 126 may also utilize a probability engine, which assembles all the historical data and real-time data and produces the odds (stored in the odds database 128) for in-play wagers. Thus, the odds calculation module 126 stores information relevant to all the potential outcomes as available wagers, which facilitates the user with better knowledge to make certain judgements about the potential performance of players in each live event 102 and place a calculated wager with a potential return on the wager. For example, in a baseball game, the odds calculation module 126 may calculate that the odds related to the possible outcomes of an at-bat for Aaron Judge of the New York Yankees hitting against Clayton Kershaw of the LA Dodgers are, hitting a single at 4/1, hitting a double at 3/1, hitting a home run at 2/1, and getting a strikeout at 2/1. Further, embodiments may include the odds database 128 which contains the odds calculated by the odds calculation module 126. The odds database 128 may be associated with each respective wagering network 122. The odds may represent the potential outcomes on the next play. For example, the odds database 128 may include odds to the overall match such as odds of winning a match, odds related to the pitcher, odds related to the hitter (scoring a single/double/home run). Further, the odds database 128 may store all the odds to be displayed via the wagering app 132. In one embodiment, the type of wagering may depend on the type of game being played.

Further, embodiments may include a mobile device 130 such as a computing device, laptop, smartphone, tablet, computer, smart speaker, or I/O devices. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. devices allow for voice recognition and inputs, including, e.g., Microsoft KINECT, SIRI for IPHONE by Apple, Google Now or Google Voice Search. Additional mobile devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also allow storage and/or an installation medium for the computing device. In still other embodiments, the computing device may allow USB connections (not shown) to receive handheld USB storage devices. In further embodiments, a I/O device may be a bridge between a system bus and an external communication bus, e.g. a USB bus, a SCSI bus, a FireWire bus, an Ethernet bus, a Gigabit Ethernet bus, a Fiber Channel bus, or a Thunderbolt bus. Further, the mobile device 130 could be an optional component and would be utilized in a situation in which the paired wearable device is utilizing the mobile device 130 as additional memory or computing power or connection to the internet.

Further, embodiments may include the wagering app 132 which allows the user to place in-play wagers during the live event 102. In one embodiment, the wagering app 132 may be a mobile application or web application, which runs on the mobile device 130. The wagering app 132 may allow the user to receive data related to the live event 102. For example, in the baseball game, Aaron Judge of the New York Yankees is playing in the 3rd inning against Clayton Kershaw of the LA dodgers. In one embodiment, the wagering app 132 may present the user with the wagers available, related to a particular live event 102. Further, the wagering app 132 may allow the user to place in-play wagers corresponding to the available wagers. In one embodiment, the wagering app 132 may facilitate the user with an interface i.e. a graphical user interface (GUI) for performing various operations such as, but not limited to, proposing new wagers, linking other applications with the wagering app 132, storing user's personal details, etc. In one embodiment, the wagering app 132 may store information related to the placed wagers. In another embodiment, the wagering app 132 may facilitate the user to enable setting reminders related to a particular live event 102. Further, when the live event 102 concludes, the wagering app 132 may facilitate settlement of balances for the user. In another embodiment, the wagering app 132 may trigger third party balance settlement apps linked to the wagering app 132 for settlement of the balances of the user. For example, the wagering app 132 may use Paypal for settlement of the balances of the user.

Figure 2:
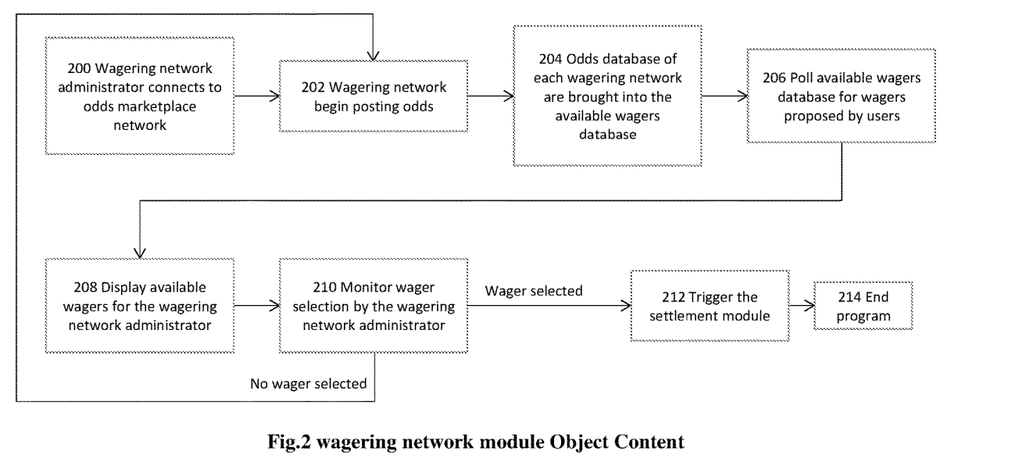
FIG. 2 illustrates a wagering network module, according to an embodiment.

FIG. 2 illustrates the wagering network module 116. The wagering network module 116 is triggered when a wagering network administrator connects, at step 200, to the odds marketplace network 108. After connecting the wagering network administrator to the wagering network module 116, the wagering network module 116 may facilitate each wagering network 122 to begin, at step 202, posting odds related to the live event 102. In one embodiment, the wagering networks 122 may be, but are not limited to, DraftKings, Wendell, or BetMGM. For example, in a baseball game, Aaron Judge of the New York Yankees, playing in the 3rd inning against Clayton Kershaw of the Los Angeles Dodgers. In a case, a first wagering network 122 i.e. Draftkings posts that the odds of Aaron Judge hitting a single are 4/1, hitting a homerun are 3/1, and hitting a double are 2/1. Further, a second wagering network 122 i.e. Wendell posts that the odds of Aaron Judge hitting a single are 3/1, hitting a homerun are 2/1, and hitting a double are 2/1. Further, a third wagering network 122 i.e. BetMGM posts that the odds of Aaron Judge hitting a homerun are 3/1 and hitting a double are 3/1. Further, the wagering network module 116 may facilitate, at step 204, the odds database 128 of each wagering network 122 brought into the available wagers database 112. For example, the odds database 128 of the first wagering network 122 (Draftkings) may include that the odds of Aaron Judge hitting a single are 4/1, hitting a homerun are 3/1, and hitting a double are 2/1, the odds database 128 of the second wagering network 122 (Wendell) may include that the odds of Aaron Judge hitting a single are 3/1, hitting a homerun are 2/1, and hitting a double are 2/1, and the odds database 128 of the third wagering network 122 (BetMGM) may include that the odds of Aaron Judge hitting a homerun are 3/1, and hitting a double are 3/1, all of which are brought into the available wagers database 112. Further, the wagering network module 116 may continuously poll, at step 206, the available wagers database 112 for the wagers proposed by users. In one case, if no wagers from the users are available, then the wagering network module 116 may return to step 202, and post odds related to new wagers available for a next play. In another case, if the wagers are available from the users, then the wagering network module 116 may display the wagers from the users, to the wagering network administrator. For example, the wagering network module 116 polls a wager proposed by the user of $100 on Aaron Judge hitting a single at odds of 4/1. Based on the determination that the wagers are available from the users, the wagering network module 116 may display, at step 208, the available wagers to the wagering network administrator. In an exemplary embodiment, the available wagers may be displayed on a display of the mobile device 130. For example, the wagering network module 116 displays a wager of $100 on Aaron Judge hitting a single at odds of 4/1, as proposed by a user. Further, the wagering network module 116 may continuously monitor, at step 210, a wager selection by the wagering network administrator. In one case, if the wagering network administrator selects the available wager, then the wagering network module 116 may trigger the settlement module 120. For example, when the wagering network administrator selects a wager of $100 on Aaron Judge hitting a single at odds of 4/1 (proposed by a user), then the wagering network module 116 triggers the settlement module 120. In another case, if the wagering network administrator does not select any available wager, then the wagering network module 116 may return to step 202, and resume posting odds. Based on the determination that the wagering network administrator selects a wager, the wagering network module 116 may trigger, at step 212, the settlement module 120. Thereafter, the program ends, at step 214.

Figure 3:
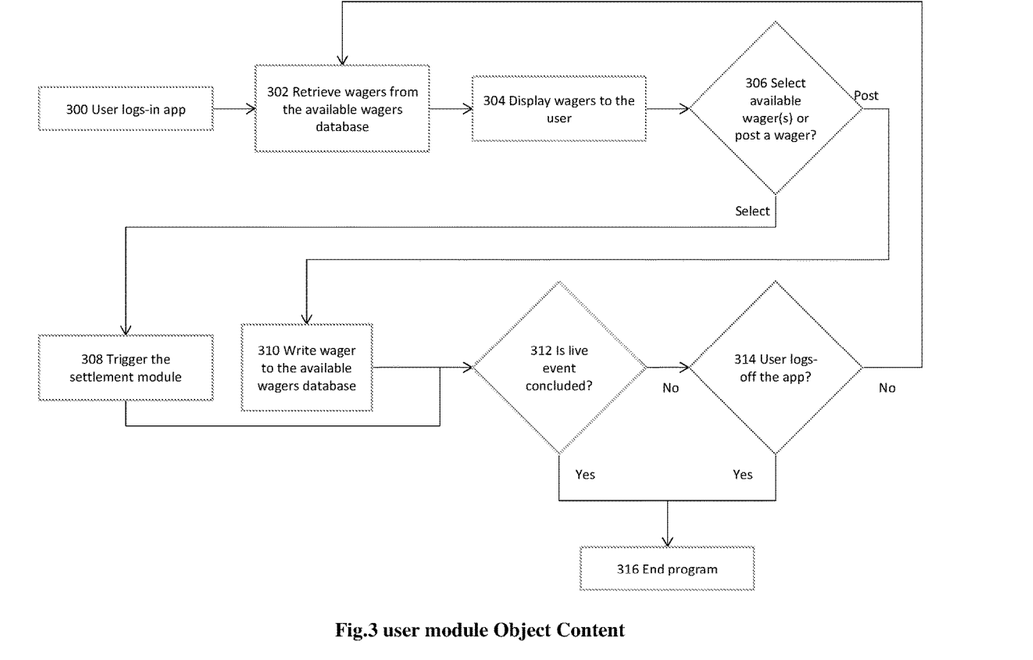
FIG. 3 illustrates a user module, according to an embodiment.

FIG. 3 illustrates the user module 118. The user module 118 is triggered when the user logs-in, at step 300, to the odds marketplace network 108. The user module 118 may facilitate the user to access the live event 102, place wagers or propose wagers related to the live event 102. Further, the user module 118 may retrieve, at step 302, wagers from the available wagers database 112. For example, the user module 118 retrieves that the odds of Aaron Judge hitting a single are 4/1 at Draftkings and 3/1 at Wendell. In this example, the user module 118 retrieves that the odds of Aaron Judge hitting a homerun are 3/1 at Draftkings, 2/1 at Wendell, and 3/1 at BetMGM. Further, the user module 118 retrieves that the odds of Aaron Judge hitting a double are 2/1 at Draftkings, 2/1 at Wendell, and 3/1 at BetMGM. Further, the user module 118 may display, at step 304, the wagers to the user. In one embodiment, the use module 118 may display the wagers on the mobile device 130. For example, the user module 118 displays that the odds of Aaron Judge hitting a single are 4/1 at Draftkings and 3/1 at Wendell. In this example, the user module 118 displays that the odds of Aaron Judge hitting a homerun are 3/1 at Draftkings, 2/1 at Wendell, and 3/1 at BetMGM. Further, the user module 118 displays that the odds of Aaron Judge hitting a double are 2/1 at Draftkings, 2/1 at Wendell, and 3/1 at BetMGM. After displaying the wagers to the user, the user module 118 may determine, at step 306, whether the user wants to select the available wager or to post a wager. In one case, when the user selects the available wager, then the user module 118 may trigger the settlement module 120. In another case, when the user wants to post a wager, then the user module 118 goes to the available wagers database 112. For example, the user wants to post a wager of $100 on Aaron Judge hitting a single at odds of 4/1. Based on the determination that the user selects to select an available wager, the user module 118 may trigger, at step 308, the settlement module 120. Based on the determination that the user selects to post a wager, the user module 118 may write, at step 310, the user's posted wager in the available wagers database 112. Thereafter, the user module 118 may constantly monitor, at step 312, the live event 102 for completion. In one case, when the live event 102 is concluded, then the user module 118 may again trigger the settlement module 120, to conclude on the wagers placed by the user. In another case, when the live event 102 is not concluded, then the user module 118 may return to step 302, in order to retrieve the wagers from the available wagers database 112. Thereafter, the user module 118 may also constantly monitor, at step 314, if the user logs-off from the wagering app 132, during the live event 102. In one case, when the user logs-off from the wagering app 132, then the user module 118 may again trigger the settlement module 120, to conclude on the wagers placed by the user. In another case, when the user does not logs-off from the wagering app 132, then the user module 118 may return to step 302, in order to retrieve the wagers from the available wagers database 112. Thereafter, the program ends at step 316.

Figure 4:
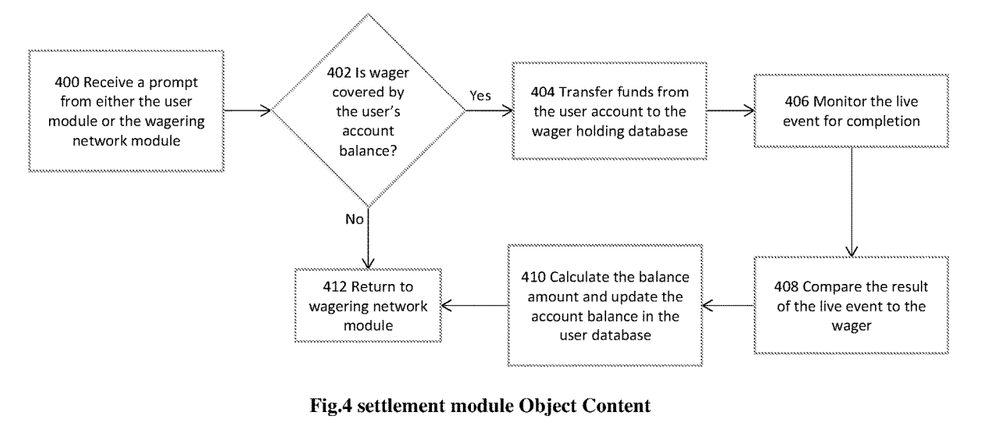
FIG. 4 illustrates a settlement module, according to an embodiment.

FIG. 4 illustrates the settlement module 120. The settlement module 120 may receive, at step 400, a prompt from either the user module 118 or the wagering network module 116 after a wager has been accepted. Further, the settlement module 120 may check, at step 402, if the selected wager is covered by the user's account balance. In one case, if the selected wager is not covered by the user's account balance, then the selected wager may be rendered void. In one embodiment, the user may be notified about low user's account balance. For example, with an opening balance of $2000, the user wants to place a wager of $2100, then the selected wager is rendered void. In another case, if the selected wager is covered by the user's account balance, then the settlement module 120 may transfer funds (i.e. wager) from the user account to the wager holding database 114. Based on the determination that the wager is covered by the user's account balance, the settlement module 120 may transfer, at step 404, funds (i.e. wager) from the user account to the wager holding database 114. For example, with an opening account balance of $2000, the user selects a wager of $100 on Aaron Judge hitting a single at odds of 4/1, the settlement module 120 transfers $100 from the user's account balance to the wager holding database 114. Further, the settlement module 120 may constantly monitor, at step 406, the live event 102 for completion. In one case, when the live event 102 is concluded then the settlement module 120 may proceed to obtain the results of the live event 102. For example, the result of the live event 102 is that Aaron Judge hits a single during the live event 102. In another case, when the live event 102 is not concluded, then the settlement module 120 may continue monitoring the live event 102 for completion. Further, the settlement module 120 may compare, at step 408, the result of the live event 102 with the wagers placed by the user, to determine a result i.e. whether the user has won or lost. In this example, the wager of $100 placed for Aaron Judge hitting a single and the result of the live event 102 i.e. Aaron Judge hits a single, are compared to determine the result of the wager i.e. a win for the user. Based on the comparison of the result of the live event 102 and the wagers placed by the user, the settlement module 120 may calculate, at step 410, the balance amount for the user. For example, the user wins the wager of $100 at +400 odds that Aaron Judge will hit a single on the next play and the result of the live event 102 is Aaron Judge hits a single. Thus, the updated balance of the user (with an opening balance of $2000) after the completion of the live event 102 will be $2000+$400=$2400. Further, the settlement module 120 may update, at step 312, the account balance of the user who places the wager in the user database 110. In this example, after winning the wager of $100 placed (at odds of 4/1), the updated balance of the user i.e. $2400. Thereafter, the process returns, at step 412, to the wagering network module 116.

Further to the above embodiments, in scenarios where a wagering exchange is utilized via a wagering network, numerous benefits can be realized. For example, the wagering exchange, as well as other embodiments herein, can allow for peer to peer communication and wagering which would not otherwise be possible when users are remotely located and are not already in communication. Such a wagering exchange may also facilitate secure transactions between peers, for example by linking any proposed wagers and accepted wagers to each accounts for each user on the wagering network. Thus, when a wager is proposed and accepted, it is ensured that the terms of the wager are agreed to by all parties and the transfer of any funds can be securely and accurately facilitated. Further, in some exemplary embodiments, the wagering network can withhold a small portion of any wager or wager winnings as the vig or otherwise as a cost for facilitating the wagering exchange and wagers themselves.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A system for providing a marketplace of odds on a wagering system, comprising:
   a wagering network connected to one or more odds databases, each of the one or more odds databases associated with a platform offering wagers on a live sporting event, and
   a wagering marketplace on the wagering network that is configured to:
   display wagers from at least two of the one or more odds databases connected to the wagering network,
   facilitate placement of wagers offered by the wagering network,
   poll the wagering network for proposed wagers,
   receive one or more wager proposals from one or more user accounts on the wagering network, and
   perform at least one of: accepting, by at least one of the one or more odds databases, one or more proposed wagers, and hosting and making available, on the at least one of the odds databases, one or more proposed wagers.

2. The system for providing a marketplace of odds in a play by play wagering system of claim 1, further comprising an available wagers database configured to store the wagers proposed by the users and available wagers from the at least one wagering network.

3. The system for providing a marketplace of odds in a play by play wagering system of claim 1, further comprising a wager holding database configured to hold funds for wagers made on the wagering network.

4. The system for providing a marketplace of odds in a play by play wagering system of claim 1, wherein the wagering network module is configured to further verify available funds for a proposed wager of a user.

5. The system for providing a marketplace of odds in a play by play wagering system of claim 1, further comprising a settlement module configured to automatically transfer funds from an escrow account following the determination of a result of an accepted wager.

6. The system for providing a marketplace of odds in a play by play wagering system of claim 1, wherein the wagering network module is configured to compare the user proposed wagers with the wagers from the at least one wagering network.

7. A system for providing a marketplace of odds on a wagering system, comprising:
   a wagering network connected to a wagering exchange, the wagering exchange facilitating wagering between different entities, and
   each of the one or more odds databases associated with a platform offering wagers on a live sporting event, and
   a wagering marketplace on the wagering exchange that is configured to:
   receive and display proposed wagers by any proposing entity on the wagering network; and
   facilitate acceptance of any proposed wager by a wagering entity on the wagering network; wherein the acceptance of any proposed wager comprises hosting, on the wagering network, the accepted proposed wager and finalizing a wager transaction between a proposing entity and the wagering entity.

* * * * *